United States Patent
Li

(10) Patent No.: US 8,267,581 B2
(45) Date of Patent: Sep. 18, 2012

(54) SLIDE MECHANISM FOR ELECTRONIC DEVICE

(75) Inventor: Shen Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/216,432

(22) Filed: Aug. 24, 2011

(65) Prior Publication Data

US 2012/0189233 A1     Jul. 26, 2012

(30) Foreign Application Priority Data

Jan. 21, 2011  (CN) .......................... 2011 1 0023816

(51) Int. Cl.
F16C 29/02 (2006.01)
F16C 29/12 (2006.01)
F16M 13/00 (2006.01)

(52) U.S. Cl. .................. 384/7; 384/20; 384/21; 384/26; 384/41; 248/424; 248/429

(58) Field of Classification Search ................ 384/7, 17, 384/24, 26, 34, 37, 40–42, 45, 20–2, 451; 474/114–115; 248/423–424, 429
See application file for complete search history.

(56) References Cited

U.S. PATENT DOCUMENTS

| | | | | |
|---|---|---|---|---|
| 1,511,336 A | * | 10/1924 | Hoey | 248/656 |
| 3,934,829 A | * | 1/1976 | Coucher | 241/259.1 |
| 4,452,545 A | * | 6/1984 | Colautti | 403/61 |
| 4,941,758 A | * | 7/1990 | Osawa | 384/42 |
| 5,584,460 A | * | 12/1996 | Ropp | 248/423 |
| 5,681,116 A | * | 10/1997 | Lin | 384/42 |
| 5,938,340 A | * | 8/1999 | Brodersen | 384/40 |
| 5,975,480 A | * | 11/1999 | Schaefer et al. | 248/657 |
| 6,336,619 B1 | * | 1/2002 | Wahls | 248/424 |
| 6,371,647 B1 | * | 4/2002 | Koyama | 384/42 |
| 6,830,291 B2 | * | 12/2004 | Langguth | 296/216.08 |
| 7,353,748 B2 | * | 4/2008 | Sato et al. | 92/165 R |
| 7,542,788 B2 | * | 6/2009 | Lee | 455/575.4 |
| 7,594,755 B2 | * | 9/2009 | Ropp | 384/34 |
| 2008/0146297 A1 | * | 6/2008 | Ho | 455/575.4 |
| 2009/0029748 A1 | * | 1/2009 | Lee | 455/575.4 |
| 2009/0149230 A1 | * | 6/2009 | Ruan | 455/575.4 |

FOREIGN PATENT DOCUMENTS

DE        4419809 A1 * 12/1995

* cited by examiner

*Primary Examiner* — Marcus Charles
(74) *Attorney, Agent, or Firm* — Altis Law Group, Inc.

(57) ABSTRACT

A slide mechanism includes a fixing plate, a slide plate, and a slide assembly. The fixing plate defines a slide groove and forms a pair of slide rails on opposite sides of the slide groove. The slide plate is positioned on the fixing plate. The slide assembly is positioned between the fixing plate and the slide plate and is allowed an assisted back and forth movement on the slide assembly, and a rotation subjected to friction at the front end of the slide assembly and the slide plate.

19 Claims, 4 Drawing Sheets

SLIDE MECHANISM FOR ELECTRONIC DEVICE

BACKGROUND

1. Technical Field

The present disclosure generally relates to slide mechanisms, and particularly, to a slide mechanism for electronic device.

2. Description of the Related Art

Many slide mechanisms include a slide plate, a fixing plate, and a slide assembly. The slide plate defines a slide groove. The slide assembly includes a resilient member, two active arms, and two connecting assemblies. One end of each active arm is rotatably connected to the slide plate via the connecting assemblies, and the other end of each active arm forms a slide post. The slide posts are slidably engaged in the slide groove of the slide plate, and form a V-shaped frame. The resilient member connects the active arms to each other, and generates an elastic force to drive the active arms to rotate, such that the slide plate slides relative to the fixing plate. However, many slide mechanisms of this type have a complex structure, and a correspondingly higher cost of manufacture.

Therefore, there is room for improvement within the art.

SUMMARY

A slide mechanism includes a fixing plate defining a slide groove and forming a pair of slide rails on opposite sides of the slide groove; a slide plate positioned on the fixing plate; and a slide assembly positioned between the fixing plate and the slide plate. Each slide rail defines at least one sloping slide surface. The slide assembly extends through the slide groove and connects the slide plate and the fixing plate, and further includes resilient member compressed between the at least one sloping slide surface and the slide plate.

Another slide mechanism includes a fixing plate forming at least one slide rail; a slide plate positioned on the fixing plate; and a slide assembly positioned between the fixing plate and the slide plate. The slide assembly connects the slide plate to the fixing plate. The at least one slide rail defines a sloping slide surface. The slide assembly further comprises an resilient member compressed between the sloping slide surface and the slide plate.

Other advantages and novel features will become more apparent from the following detailed description of various embodiments, when taken in conjunction with the accompanying drawings

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
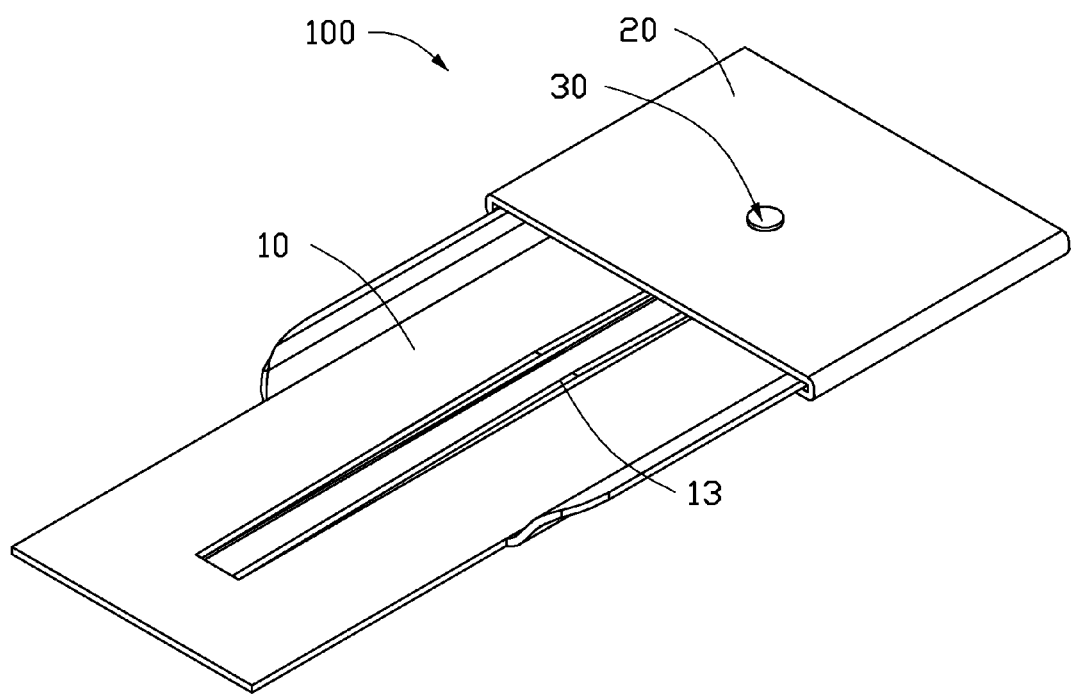
FIG. 1 is an isometric view of an embodiment of an assembled slide mechanism including a fixing plate, a slide plate, and a slide assembly.

Referring to the FIG. 1, an embodiment of a slide mechanism 100 for an electronic device (not shown) includes a fixing plate 10, a slide plate 20 slidably positioned on the fixing plate 10, and a slide assembly 30 positioned between the fixing plate 10 and the slide plate 20, and the slide assembly 30 is slidably connecting the slide plate 20 to the fixing plate 10.

Figure 2:
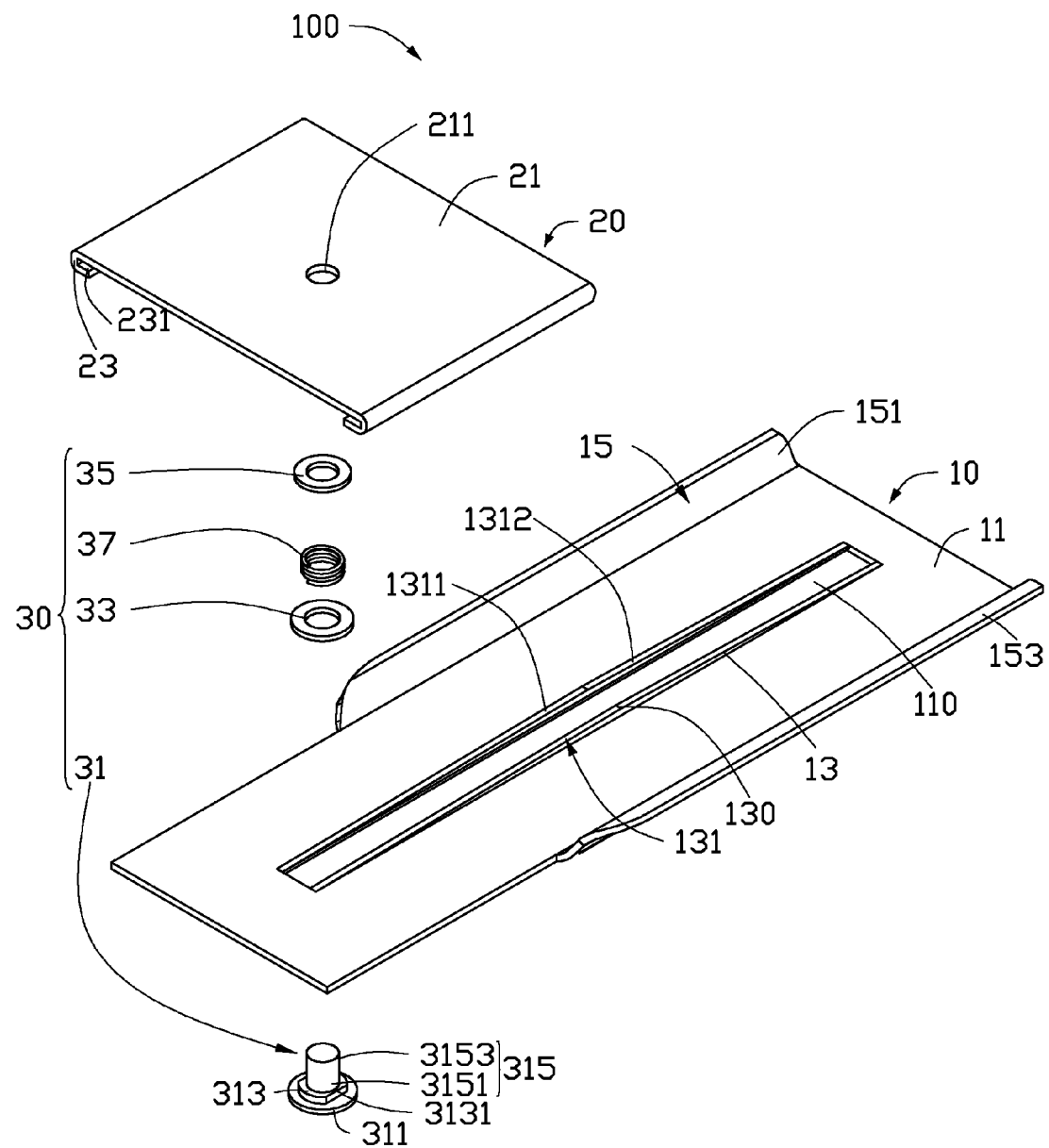
FIG. 2 is an exploded, isometric view of the slide mechanism of FIG. 1.

Referring to FIG. 2, the fixing plate 10 includes a main body 11, two slide rails 13, and two guiding flanges 15. In the illustrated embodiment, the main body 11 is substantially rectangular, and defines a slide groove 110 in a middle portion of the main body 11. The slide groove 110 is a thin rectangular slot.

The slide rails 13 are formed on opposite sides of the slide groove 110. The slide rails 13 are in the form of very shallow triangular structures. Each slide rail 13 includes a top surface 131, and the top surface 131 includes a first sloping slide surface 1311 and a second sloping slide surface 1312. The first sloping slide surface 1311 and the second sloping slide surface 1312 are symmetrical, and are risen up to intersect with each other at a top line 130.

The guiding flanges 15 are formed on opposite sides of the main body 11, and are shorter than the main body 11, respectively. Each guiding flange 15 includes a connecting portion 151 extending from one side of the main body 11, and a guiding portion 153 extending from one side of the connecting portion 151 away from the main body 11.

The slide plate 20 includes a main portion 21 and two sliding portions 23. In the illustrated embodiment, the main portion 21 is substantially rectangular, and defines an assembly hole 211 approximately in the center of the main portion 21. The sliding portions 23 are formed on opposite sides of the main portion 21, and each sliding portion 23 together with the main portion 21 define a guiding groove 231 corresponding to the guiding flange 15 of the fixing plate 10.

The slide assembly 30 includes a slide member 31, a washer 33, a friction member 35, and a resilient member 37. The slide member 31 includes a positioning portion 311, a sliding portion 313, and a connecting post 315. The positioning portion 311 is circular, and has a diameter larger than a width of the slide groove 110. In plan view, the sliding portion 313 is oval in shape, so as to be capable of sliding but not rotating in the slide groove 110. The connecting post 315 extends from the sliding portion 313, and has a shaft portion 3151 and a fixing portion 3153.

The washer 33 and the friction member 35 are annular, and are sleeved on the connecting post 315. The resilient member 37 also is sleeved on the connecting post 315, and positioned between the washer 33 and the friction member 35. In the embodiment, the resilient member 37 is a compression spring.

In assembly, the slide member 31 is engaged into the slide groove 110 of the fixing plate 10 with a plurality of slide surfaces 3131 attaching to the inner sidewalls of the slide groove 110. The washer 33, the resilient member 37, and the friction member 35 are sleeved on the connecting post 315 of the slide member 31, and then the washer 33 abuts the slide rails 13. The slide plate 20 is sleeved on the connecting post 315 with the guiding portions 153 slidably engaging in the guiding groove 231 of the slide plate 20. The fixing portion 3153 of the connecting post 315 is punched to form a deformed portion (not shown) having a larger diameter than that of the shaft portion 3151, to fasten the fixing plate 10 and the slide plate 20 together as if being riveted. Then, the resilient member 37 finds itself being compressed between the fixing plate 10 and the slide plate 20.

Figure 3:
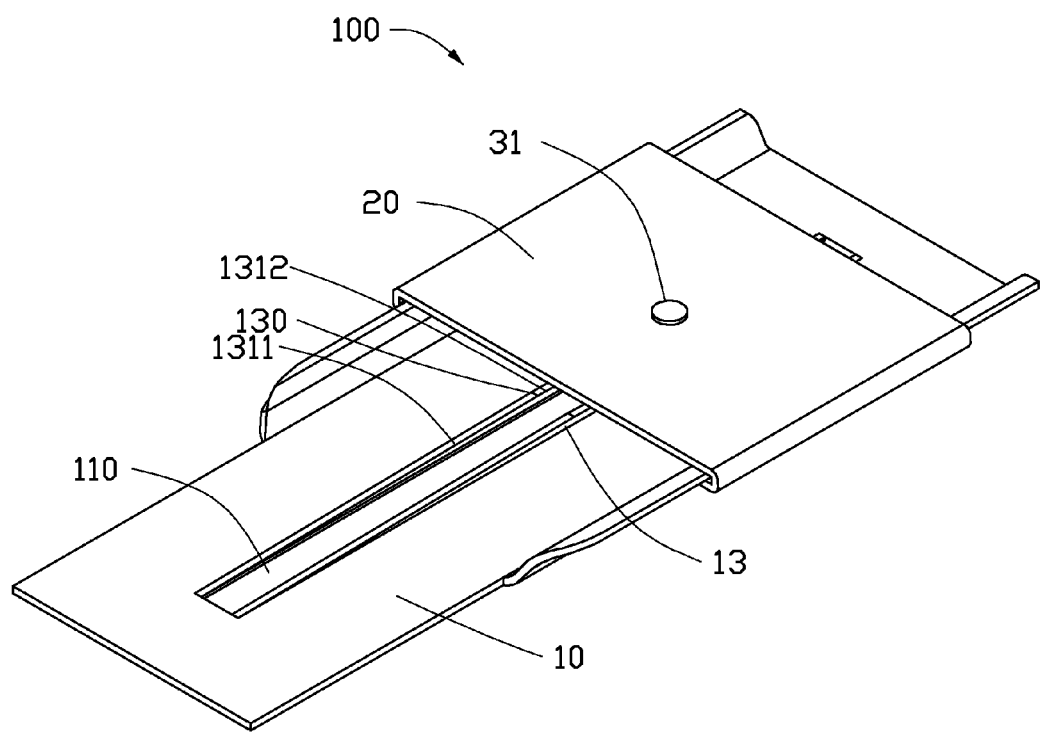
FIG. 3 is similar to FIG. 1, and showing the slide plate sliding on the fixing plate.

Referring to FIGS. 2 and 3, in use, an external force is applied on the slide plate 20, and the resilient member 37 thereby accepts the corresponding compression force. When the washer 33 is abutting on the top line 130 of the slide rails 13, the resilient member 37 is in a state of maximum compression. After the washer 33 has passed over and beyond the top line 130, the external force may be removed, and the resilient energy of the resilient member 37 is released, such that the slide plate 20 is sliding simply by virtue of the inherent resilient force possessed by the resilient member 37 when naturally being released. When the washer 33 has slid to the end of the first sloping slide surface 1311 adjacent to the main body 11, the sliding portions 23 of the slide plate 20 are disengaged from the guiding flanges 15, and the slide plate 20 is then capable of rotating relative to the fixing plate 10.

Figure 4:
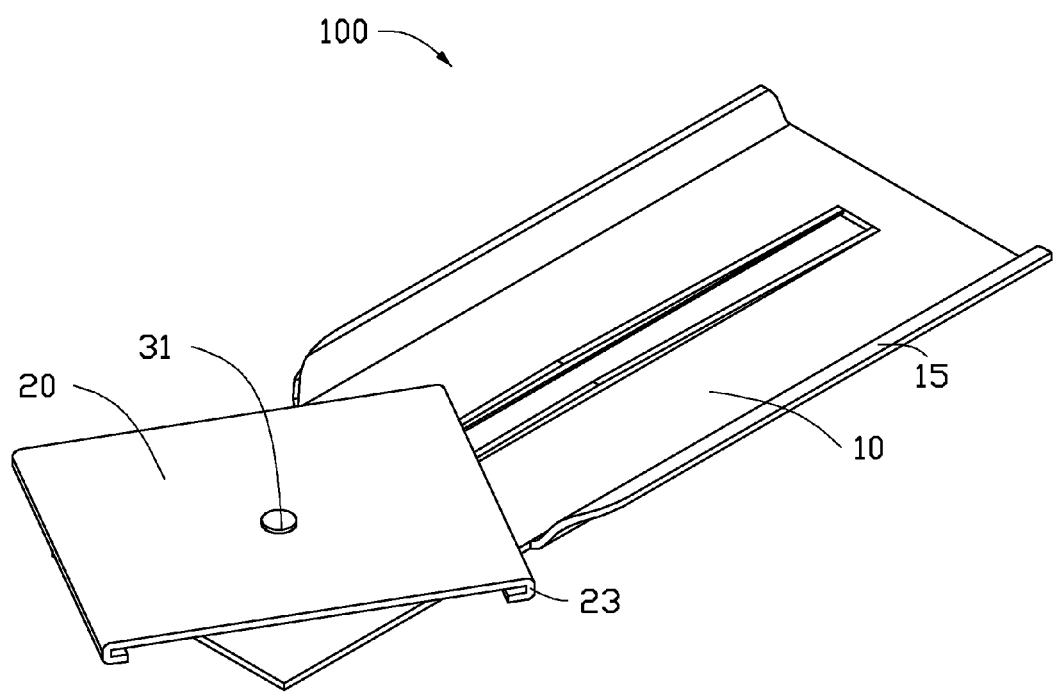
FIG. 4 is similar to FIG. 1, and showing the slide plate rotating relative to the fixing plate.

Referring to FIGS. 2 and 4, the slide plate 20 may be rotated by hand through a predetermined angle relative to the fixing plate 10, and the slide plate 20 will remain in the configuration or direction to which it was rotated, because of the friction created between the friction member 35 and the slide plate 20.

The substantially triangular shape of the slide rails 13 assists the slide plate 20 in sliding relative to the fixing plate 10, when the washer 33 rests on the first sloping slide surface 1311. Moreover, the slide plate 20 can rotate relative to the fixing plate 10 when the sliding portions 23 are disengaged from the guiding flanges 15, and can be positioned in any angular position due to the friction between the friction member 35 and the slide plate 20. Therefore, the slide mechanism 100 has a very simple structure, and the slide plate 20 can both slide and rotate relative to the fixing plate 10.

In other embodiments, the slide mechanism 100, the washer 33, the friction member 35, and the resilient member 37 may not be directly positioned between the slide plate 20 and the slide rails 13. The first sloping slide surface 1311 and the second sloping slide surface 1312 may be curved. A restricting groove acting as an end stop (not shown) may be defined in the end of the first sloping slide surface 1311 adjacent to the main body 11, for restricting the range of movement of the slide plate 20. In addition, the fixing plate 10 may be formed of only one or of more than two slide rails 13, and the slide rails 13 may be formed and shaped accordingly.

While the present disclosure has been described with reference to particular embodiments, the description is illustrative and is not to be construed as limiting the disclosure. Therefore, various modifications can be made to the embodiments by those of ordinary skill in the art without departing from the true spirit and scope of the disclosure, as defined by the appended claims.

What is claimed is:

1. A slide mechanism, comprising:
a fixing plate defining a slide groove and forming a pair of slide rails on opposite sides of the slide groove;
a slide plate positioned on the fixing plate; and
a slide assembly positioned between the fixing plate and the slide plate;
wherein each slide rail defines at least one sloping slide surface; the slide assembly extends through the slide groove and connects the slide plate and the fixing plate, and further comprises a resilient member compressed between the at least one sloping slide surface and the slide plate.

2. The slide mechanism of claim 1, wherein a count of the number of the at least one sloping slide surface is two, the two sloping slide surfaces are symmetrically arranged, and intersects with each other at a top line.

3. The slide mechanism of claim 2, wherein the slide rails are substantially triangular.

4. The slide mechanism of claim 1, wherein the slide assembly further comprises a slide member, the slide member comprises a connecting post extending through the slide groove of the fixing plate and rotatably connected to the slide plate, and the resilient member sleeves on the connecting post.

5. The slide mechanism of claim 4, wherein the slide member further comprises a positioning portion and a sliding portion connecting the positioning portion to the connecting post, and the sliding portion is received in the slide groove.

6. The slide mechanism of claim 5, wherein the sliding portion has two flat slide surfaces opposite to each other and two arc surfaces respectively connecting the slide surfaces, and a distance between the two slide surfaces is equal to or slightly smaller than the width of the slide groove.

7. The slide mechanism of claim 4, wherein the slide assembly further comprises a friction member sleeved on the connecting post and positioned between the resilient member and the slide plate.

8. The slide mechanism of claim 4, wherein the slide assembly further comprises a washer sleeved on the connecting post and positioned between the resilient member and the slide rails.

9. The slide mechanism of claim 1, wherein the fixing plate comprises a main body and two guiding flanges formed on opposite sides of the main body; the slide plate comprises a main portion and two sliding portions formed on opposite sides of the main portion, and the sliding portions slidably engage with the guiding flanges.

10. The slide mechanism of claim 9, wherein a length of the guiding flanges is smaller than the length of the main body.

11. The slide mechanism of claim 1, wherein the fixing plate comprises a main body and two guiding flanges formed on opposite sides of the main body; the slide plate comprises a main portion and two sliding portions formed on opposite sides of the main portion, and the sliding portions slidably engage with the guiding flanges.

12. The slide mechanism of claim 11, wherein a length of the guiding flange is smaller than the length of the main body.

13. A slide mechanism, comprising:
a fixing plate forming at least one slide rail;
a slide plate positioned on the fixing plate; and
a slide assembly positioned between the fixing plate and the slide plate, and connecting the slide plate to the fixing plate;
wherein the at least one slide rail defines a sloping slide surface; the slide assembly further comprises a resilient member compressed between the sloping slide surface and the slide plate.

14. The slide mechanism of claim 13, wherein a count of the number of the at least one sloping slide surface is two, the two sloping slide surfaces are symmetrically arranged, and intersected with each other at a top line.

15. The slide mechanism of claim 14, wherein the slide rails are substantially triangular.

16. The slide mechanism of claim 13, wherein the slide assembly further comprises a slide member, the slide member comprises a connecting post rotatably connecting the slide plate to the fixing plate, and the resilient member sleeves on the connecting post.

17. The slide mechanism of claim 16, wherein the slide member further comprises a positioning portion and a sliding portion connecting the positioning portion to the connecting post, and the sliding portion is received in the slide groove.

18. The slide mechanism of claim 16, wherein the slide assembly further comprises a friction member sleeved on the connecting post and positioned between the resilient member and the slide plate.

19. The slide mechanism of claim 16, wherein the slide assembly further comprises a washer sleeved on the connecting post and positioned between the resilient member and the slide rails.

* * * * *